(12) United States Patent
Matsumura

(10) Patent No.: US 8,418,823 B2
(45) Date of Patent: Apr. 16, 2013

(54) ELECTRICALLY POWERED VEHICLE

(75) Inventor: Naohide Matsumura, Nisshin (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/060,232

(22) PCT Filed: Mar. 12, 2009

(86) PCT No.: PCT/JP2009/054730
§ 371 (c)(1),
(2), (4) Date: Feb. 22, 2011

(87) PCT Pub. No.: WO2010/103639
PCT Pub. Date: Sep. 16, 2010

(65) Prior Publication Data
US 2011/0259694 A1    Oct. 27, 2011

(51) Int. Cl.
*B60L 9/00* (2006.01)
*H01F 38/14* (2006.01)

(52) U.S. Cl.
USPC ............................................................. 191/10

(58) Field of Classification Search .............. 191/10, 191/18, 22 R, 45 R; 307/104; 180/68.5
See application file for complete search history.

(56) References Cited

U.S. PATENT DOCUMENTS

| | | | |
|---|---|---|---|
| 7,610,978 B2 * | 11/2009 | Takasaki et al. | 180/68.5 |
| 7,741,734 B2 | 6/2010 | Joannopoulos et al. | |
| 2007/0222542 A1 | 9/2007 | Joannopoulos et al. | |
| 2008/0265684 A1 * | 10/2008 | Farkas | 307/104 |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0242299 A1 * | 10/2009 | Takasaki et al. | 180/68.5 |
| 2009/0261778 A1 | 10/2009 | Kook | |
| 2009/0267709 A1 | 10/2009 | Joannopoulos et al. | |
| 2009/0267710 A1 | 10/2009 | Joannopoulos et al. | |
| 2010/0065352 A1 | 3/2010 | Ichikawa | |
| 2010/0096934 A1 | 4/2010 | Joannopoulos et al. | |

(Continued)

FOREIGN PATENT DOCUMENTS

AT    2007349874 A2    10/2008
AU    2006269374 B2    1/2007

(Continued)

OTHER PUBLICATIONS

Kurs et al., "Wireless Power Transfer via Strongly Coupled Magnetic Resonances," *Science*, 2007, vol. 317, No. 83, pp. 83-86.

(Continued)

*Primary Examiner* — S. Joseph Morano
*Assistant Examiner* — Zachary Kuhfuss
(74) *Attorney, Agent, or Firm* — Oliff & Berridge, PLC

(57) ABSTRACT

An electric vehicle can run with power supplied from a power supply facility on the outside of the vehicle. A resonator for power reception is disposed under a metallic under body and configured to receive power from a resonator for power transmission in the power supply facility by resonating with the resonator through an electromagnetic field. A power storage device stores power received by the resonator for power reception. A power cable is laid under the under body along with the resonator for power reception, and configured to transmit power received by the resonator for power reception.

10 Claims, 6 Drawing Sheets

U.S. PATENT DOCUMENTS

| | | |
|---|---|---|
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0106349 A1* | 5/2011 | Sakita .................. 701/22 |
| 2011/0114400 A1* | 5/2011 | Kanno .................. 180/65.21 |

FOREIGN PATENT DOCUMENTS

| | | |
|---|---|---|
| AU | 2006269374 C1 | 1/2007 |
| AU | 2010200044 A1 | 1/2010 |
| CA | 2 615 123 A1 | 1/2007 |
| CA | 2 682 284 A1 | 10/2008 |
| CN | 101147308 A | 3/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-10-109548 | 4/1998 |
| JP | A-2001-177917 | 6/2001 |
| JP | A-2004-229421 | 8/2004 |
| JP | A-2008-054424 | 3/2008 |
| JP | A-2009-501510 | 1/2009 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2009/054221 A1 | 4/2009 |

OTHER PUBLICATIONS

International Search Report in International Application No. PCT/JP2009/054730; dated Jun. 9, 2009 (with English-language translation).

Chinese Office Action dated Apr. 5, 2012 for Chinese Patent Application No. 200980157917.X. (with English language translation).

* cited by examiner

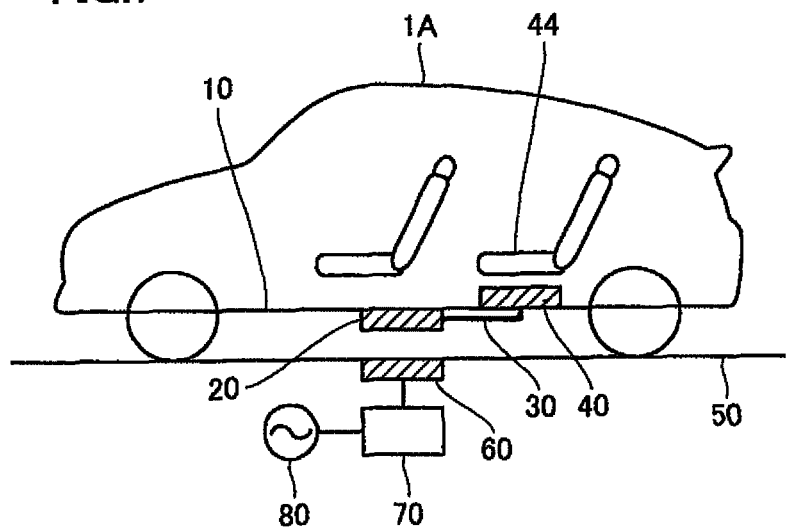
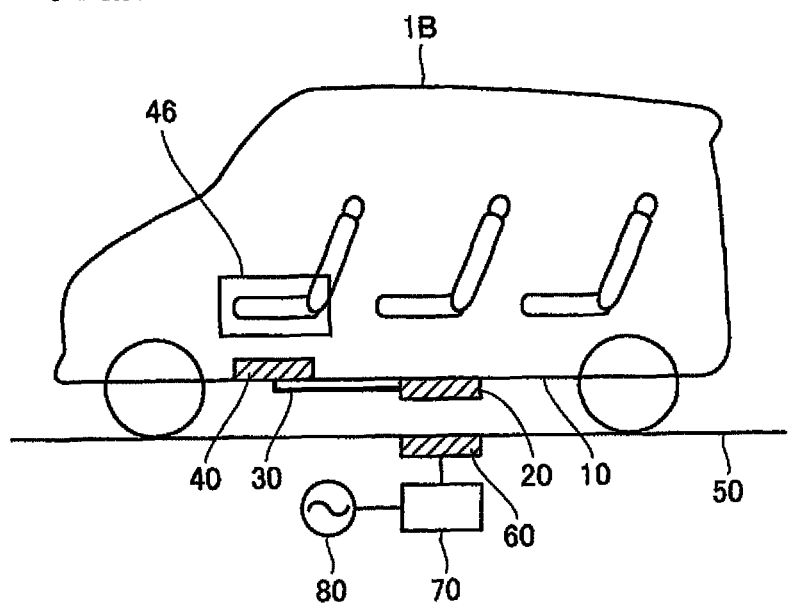

ELECTRICALLY POWERED VEHICLE

TECHNICAL FIELD

The present invention relates to an electrically powered vehicle, and more particularly to an electrically powered vehicle capable of receiving power from a power supply outside of the vehicle in a non-contact manner by resonance.

BACKGROUND ART

Electrically powered vehicles such as electric vehicles and hybrid vehicles have attracted a lot of attention as environmentally friendly vehicles. An electric vehicle has a vehicle-mounted battery charged by a power supply outside of the vehicle, and travels by driving a motor with the charged power. A hybrid vehicle incorporates a motor as well as an engine as a driving source, or additionally incorporates a fuel cell as a DC power supply for driving the vehicle.

As with an electric vehicle, a hybrid vehicle having a vehicle-mounted battery that can be charged by a power supply outside of the vehicle is known. For example, a so-called "plug-in hybrid vehicle" is known in which a vehicle-mounted battery can be charged by a power supply in an ordinary household by connecting a power supply outlet provided at the house to a charging inlet provided in the vehicle by a charging cable.

Wireless power transfer without using a power cord or a power transfer cable has been receiving attention in recent years as a method of transferring power. Power transfer using electromagnetic induction, power transfer using a microwave, and power transfer by resonance are known as dominant techniques for wirelessly transferring power.

Resonance is a technique for causing a pair of resonators (e.g., a pair of self-resonant coils) to resonate with each other in an electromagnetic field (near field) to transfer power in a non-contact manner through the electromagnetic field, and can transfer a large amount of power of several kW across a relatively long distance (e.g., several meters) (see Non-Patent Document 1).

Non-Patent Document 1: Andre Kurs et al., "Wireless Power Transfer via Strongly Coupled Magnetic Resonances," [online], Jul. 6, 2007, Science, Vol. 317, pp. 83-86, [searched on Sep. 12, 2007], the Internet <URL:http://www.sciencemag.org/cgi/reprint/317/5834/83.pdf>

DISCLOSURE OF THE INVENTION

Problems to be Solved by the Invention

When the technique for transferring power in a non-contact manner by resonance described above is used to feed power to an electrically powered vehicle from a power supply outside of the vehicle, high-frequency power on the order of several hundred kHz, for example, is received at the vehicle. As a result, an electromagnetic wave generated due to the power reception may adversely affect all sorts of electric equipment in the vehicle.

Therefore, it is an object of the present invention to provide an electrically powered vehicle suppressing adverse effect on electric equipment in the vehicle caused by an electromagnetic wave generated due to power reception from a power supply outside of the vehicle.

Means for Solving the Problems

According to the present invention, an electrically powered vehicle capable of traveling with power supplied from a power supply outside of the vehicle includes a power receiving resonator, a power storage device, and a power cable. The power receiving resonator is provided under an underbody made of metal, and configured to receive power from a power transferring resonator of the power supply outside of the vehicle by resonating with the power transferring resonator through an electromagnetic field. The power storage device stores the power received by the power receiving resonator. The power cable is provided under the underbody together with the power receiving resonator, and configured to transfer the power received by the power receiving resonator to the power storage device.

Preferably, the power storage device is provided over the underbody, and covered with a member capable of shielding an electromagnetic wave.

Still preferably, the member is made of metal.

Still preferably, the power storage device is provided under the underbody,

Preferably, the electrically powered vehicle further includes a rectifier. The rectifier is configured to rectify AC power received by the power receiving resonator. The rectifier is provided under the underbody.

Effects of the Invention

In this electrically powered vehicle, the power receiving resonator receives high-frequency power from the power transferring resonator of the power supply outside of the vehicle by resonating with the power transferring resonator through an electromagnetic field. Since the power receiving resonator is provided under the underbody made of metal, an electromagnetic wave generated around the power receiving resonator due to the reception of high-frequency power is shielded by the underbody, so that effect of the electromagnetic wave on the inside of the vehicle is suppressed. The electromagnetic wave generated due to the power reception is propagated through the power cable for transferring the power received by the power receiving resonator to the power storage device. In this electrically powered vehicle, however, the power cable is also provided under the underbody made of metal, so that an electromagnetic wave generated by the power cable is also shielded by the underbody.

According to this electrically powered vehicle, therefore, adverse effect on electric equipment in the vehicle caused by the electromagnetic wave generated due to the power reception from the power supply outside of the vehicle can be suppressed.

BRIEF DESCRIPTION OF THE DRAWINGS

FIG. 7 shows arrangement of main parts in the present invention seen from a side of an electrically powered vehicle according to a first modification of the first embodiment.

FIG. 8 shows arrangement of main parts in the present invention seen from a side of an electrically powered vehicle according to a second modification of the first embodiment.

Figure 1:
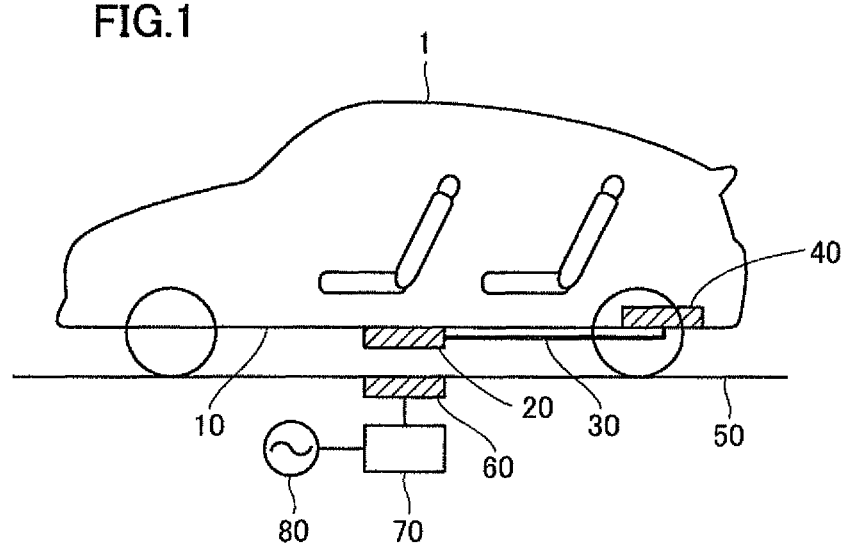
FIG. 1 shows arrangement of main parts in the present invention seen from a side of an electrically powered vehicle according to a first embodiment of the invention.

DESCRIPTION OF THE REFERENCE SIGNS 1, 1A to 1C electrically powered vehicle; 10 underbody; 20 power receiving resonator; 22, 340 secondary self-resonant coil; 24, 350 secondary coil; 30 power cable; 35 rectifier; 40 power storage device; 42 electromagnetic shielding material; 44 rear seat; 46 center console; 50 ground; 60 power transferring resonator; 70 high-frequency power supply driver; 80 AC power supply; 110 PCU; 112 boost converter; 114, 116 inverter; 120, 122 motor generator; 124 engine; 126 power split device; 128 drive wheel; 130 ECU; 310 high-frequency power supply; 320 primary coil; 330 primary self-resonant coil; 360 load; SMR1, SMR2 system main relay; PL1, PL2 positive electrode line; NL1, NL2 negative electrode line.

BEST MODES FOR CARRYING OUT THE INVENTION

Embodiments of the present invention will be described hereinafter in detail with reference to the drawings. It is noted that the same or corresponding parts have the same reference characters allotted in the drawings, and description thereof will not be repeated.

First Embodiment

FIG. 1 shows arrangement of main parts in the present invention seen from a side of an electrically powered vehicle according to a first embodiment of the invention. Referring to FIG. 1, an electrically powered vehicle 1 includes an underbody 10, a power receiving resonator 20, a power cable 30, and a power storage device 40. Electrically powered vehicle 1 is configured to receive power supplied from a power feeding apparatus which is provided outside of the vehicle and will be described later, and to be able to travel by a not-shown traveling motor.

Underbody 10 is a lower surface of a body of the vehicle, and includes a member made of metal. While underbody 10 is generally made of iron, the present invention is not limited to a case where underbody 10 is made of iron (underbody 10 is made of iron hereinafter).

Power receiving resonator 20 is fixed under underbody 10 (i.e., outside of the vehicle). Power receiving resonator 20 is configured to be able to receive power from a power transferring resonator 60 of the power feeding apparatus in a non-contact manner by resonating with power transferring resonator 60 through an electromagnetic field. By way of example, power receiving resonator 20 includes a self-resonant coil (LC resonant coil) configured to resonate with power transferring resonator 60 through an electromagnetic field at a high frequency of several hundred kHz, a high dielectric disk made of a high dielectric constant material such as $TiO_2$, $BaTi_4O_9$ or $LiTaO_3$, or the like.

Power cable 30 is provided under underbody 10 together with power receiving resonator 20. Power cable 30 transfers the power received by power receiving resonator 20 to power storage device 40.

Power storage device 40 is provided over underbody 10 (i.e., inside of the vehicle) in the first embodiment, and more specifically provided in a luggage room. Power storage device 40 is a rechargeable DC power supply, and includes a secondary battery such as a lithium-ion battery or a nickel-metal hydride battery. Power storage device 40 temporarily stores the power received by power receiving resonator 20 and power generated by a not-shown traveling motor or generator, and supplies the stored power to the traveling motor during travel. A capacitor having a large capacity may be employed as power storage device 40.

The power feeding apparatus capable of supplying power to electrically powered vehicle 1 includes power transferring resonator 60, a high-frequency power supply driver 70, and an AC power supply 80. Power transferring resonator 60 is provided in the ground 50, and supplied with power from high-frequency power supply driver 70. Power transferring resonator 60 is configured to be able to transfer the high-frequency power received from high-frequency power supply driver 70 to power receiving resonator 20 of electrically powered vehicle 1 in a non-contact manner by resonating with power receiving resonator 20 through an electromagnetic field. As with power receiving resonator 20, power transferring resonator 60 includes, for example, a self-resonant coil (LC resonant coil) configured to resonate with power receiving resonator 20 through an electromagnetic field at a high frequency of several hundred kHz, a high dielectric disk made of a high dielectric constant material, or the like.

High-frequency power supply driver 70 converts power received from AC power supply 80 to high-frequency power, and supplies the same to power transferring resonator 60. The high-frequency power generated by high-frequency power supply driver 70 has a frequency of about several hundred kHz, for example.

Figure 2:
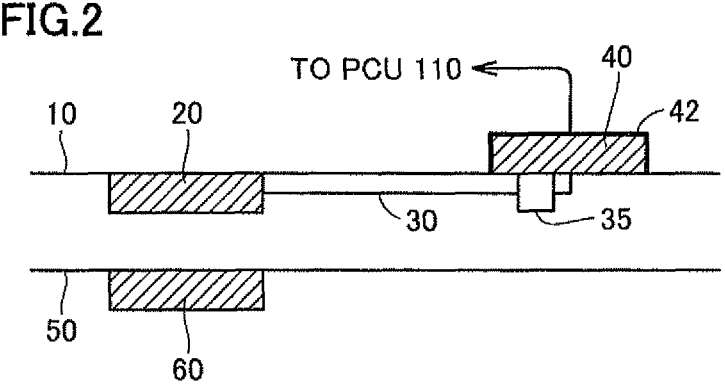
FIG. 2 is an enlarged view of a portion around an underbody of the electrically powered vehicle shown in FIG. 1.

FIG. 2 is an enlarged view of a portion around the underbody of electrically powered vehicle 1 shown in FIG. 1. Referring to FIG. 2, power receiving resonator 20 is provided under underbody 10 made of iron (i.e., outside of the vehicle). A high-frequency electromagnetic wave is generated around power receiving resonator 20 due to power reception from power transferring resonator 60 of the power feeding apparatus. However, the provision of power receiving resonator 20 under underbody 10 allows underbody 10 made of iron to shield the electromagnetic wave, thereby suppressing effect of the electromagnetic wave on the inside of the vehicle.

In electrically powered vehicle 1, power cable 30 is also provided under underbody 10 (i.e., outside of the vehicle). Power cable 30 is connected to power receiving resonator 20, and thus serves as a source of generating an electromagnetic wave when the high-frequency electromagnetic wave generated due to the power reception is propagated through power cable 30. However, the provision of power cable 30 under underbody 10 allows underbody 10 made of iron to shield the electromagnetic wave, thereby suppressing effect of the electromagnetic wave on the inside of the vehicle.

The high-frequency power received by power receiving resonator 20 and flowing through power cable 30 is rectified by a rectifier 35 (not shown in FIG. 1), and stored in power storage device 40 provided over underbody 10 (i.e., inside of the vehicle). Rectifier 35 is also provided under underbody 10 (i.e., outside of the vehicle) because rectifier 35 for receiving via power cable 30 the high-frequency power received by power receiving resonator 20 also serves as a source of generating an electromagnetic wave.

Power storage device 40 is electrically connected to power cable 30 and power receiving resonator 20, although via rectifier 35. It is thus preferable to cover power storage device 40 with a member 42 capable of shielding an electromagnetic wave. A member made of metal such as iron which is highly effective in electromagnetic shielding, or a cloth having the effect of shielding an electromagnetic wave, for example, may be employed as member 42. If rectifier 35 is covered with a member capable of shielding an electromagnetic wave, rectifier 35 may be provided over underbody 10 (i.e., inside of the vehicle) together with power storage device 40.

In this manner, in electrically powered vehicle 1, not only power receiving resonator 20 for receiving high-frequency power by resonance but also power cable 30 for transferring the power received by power receiving resonator 20 to power storage device 40 is provided under underbody 10 made of iron (i.e., outside of the vehicle). Accordingly, entry of the high-frequency electromagnetic wave generated due to the power reception from the power feeding apparatus into the vehicle can be suppressed.

Further, in the first embodiment, while power storage device 40 is provided over underbody 10 (i.e., inside of the vehicle), power storage device 40 is covered with member 42 capable of shielding an electromagnetic wave, thereby suppressing effect of the electromagnetic wave on the inside of the vehicle more sufficiently.

Figure 3:
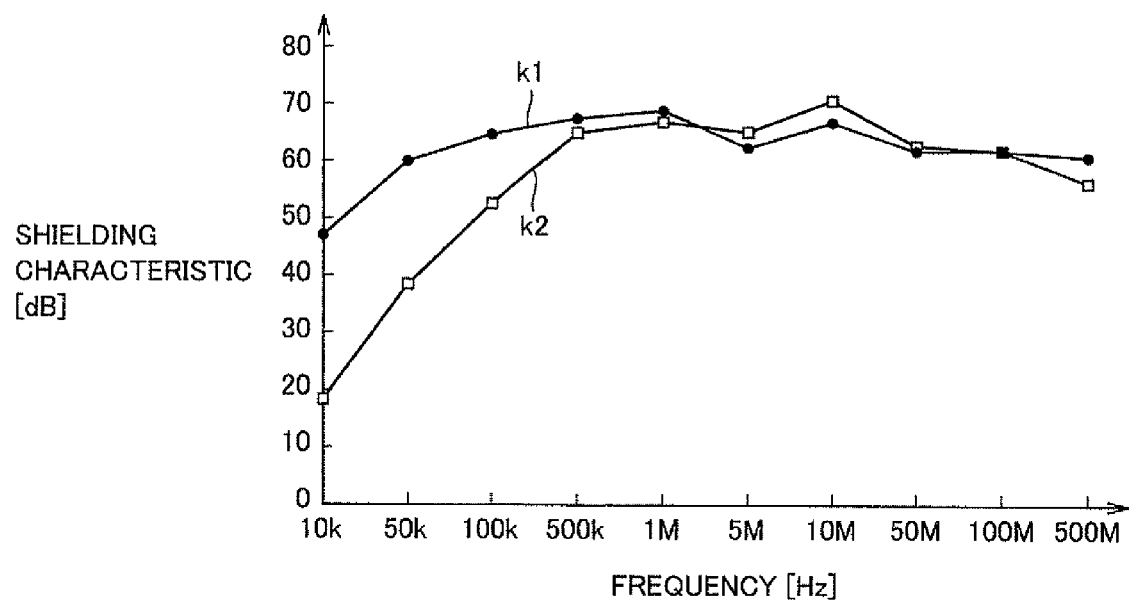
FIG. 3 is a graph illustrating effect of shielding an electromagnetic field by iron.

FIG. 3 is a graph illustrating effect of shielding an electromagnetic field by iron. Referring to FIG. 3, a broken curve k1 denotes effect of shielding an electromagnetic field by iron, and for comparison a broken curve k2 denotes effect of shielding an electromagnetic field by aluminum. In the graph, a horizontal axis represents a frequency of an electromagnetic field, and a vertical axis represents a shielding characteristic. In electrically powered vehicle 1, as described above, power is transferred from power transferring resonator 60 to power receiving resonator 20 through an electromagnetic field by resonance of power transferring resonator 60 and power receiving resonator 20 at a high frequency of several hundred kHz. As shown in FIG. 3, iron has a shielding characteristic better than that of aluminum at a frequency smaller than 500 kHz, and is highly effective in shielding an electromagnetic wave during power transfer by resonance where a frequency smaller than 500 kHz may be used.

Figure 4:
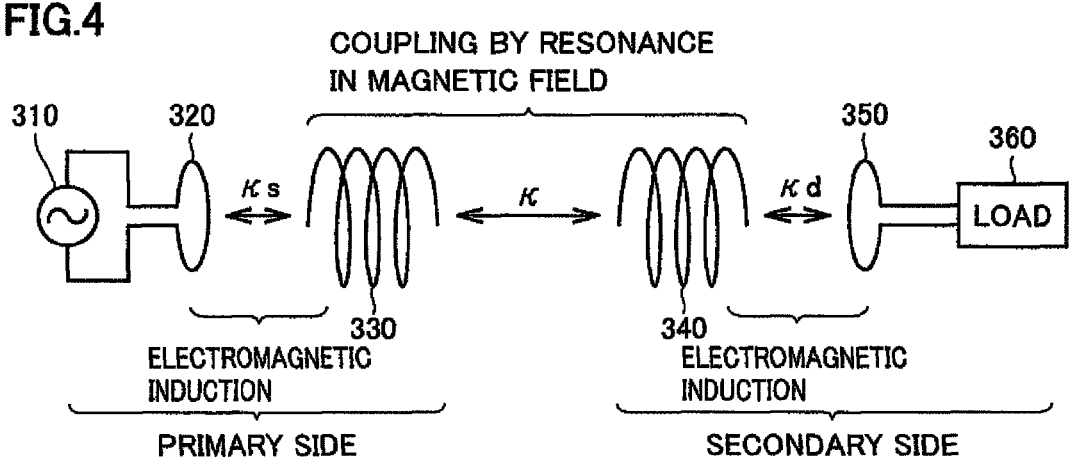
FIG. 4 illustrates the principles of power transfer by resonance.

FIG. 4 illustrates the principles of power transfer by resonance. FIG. 4 shows an example where LC resonant coils are used as resonators. Referring to FIG. 4, resonance is such that, when two LC resonant coils having the same natural frequency resonate with each other in an electromagnetic field (near field) in the same way that two tuning forks resonate with each other, power is transmitted from one of the resonant coils to the other resonant coil through the electromagnetic field.

More specifically, a primary coil 320 is connected to a high-frequency power supply 310, and high-frequency power of several hundred kHz is fed to a primary self-resonant coil 330 magnetically coupled to primary coil 320 by electromagnetic induction. Primary self-resonant coil 330 is an LC resonator having an inductance of the coil itself and a stray capacitance, and resonates with a secondary self-resonant coil 340 having a resonant frequency the same as that of primary self-resonant coil 330 through an electromagnetic field (near field). Consequently, energy (power) is transferred from primary self-resonant coil 330 to secondary self-resonant coil 340 through the electromagnetic field. The energy (power) transferred to secondary self-resonant coil 340 is taken by a secondary coil 350 magnetically coupled to secondary self-resonant coil 340 by electromagnetic induction, and supplied to a load 360. Power transfer by resonance is implemented when a Q value indicating resonant strength of primary self-resonant coil 330 and secondary self-resonant coil 340 is greater than 100, for example.

Primary coil 320 is provided in order to facilitate power feeding to primary self-resonant coil 330, and secondary coil 350 is provided in order to facilitate taking of power from secondary self-resonant coil 340. Power may be fed directly from high-frequency power supply 310 to primary self-resonant coil 330 without providing primary coil 320, and power may be taken directly from secondary self-resonant coil 340 without providing secondary coil 350.

Figure 5:
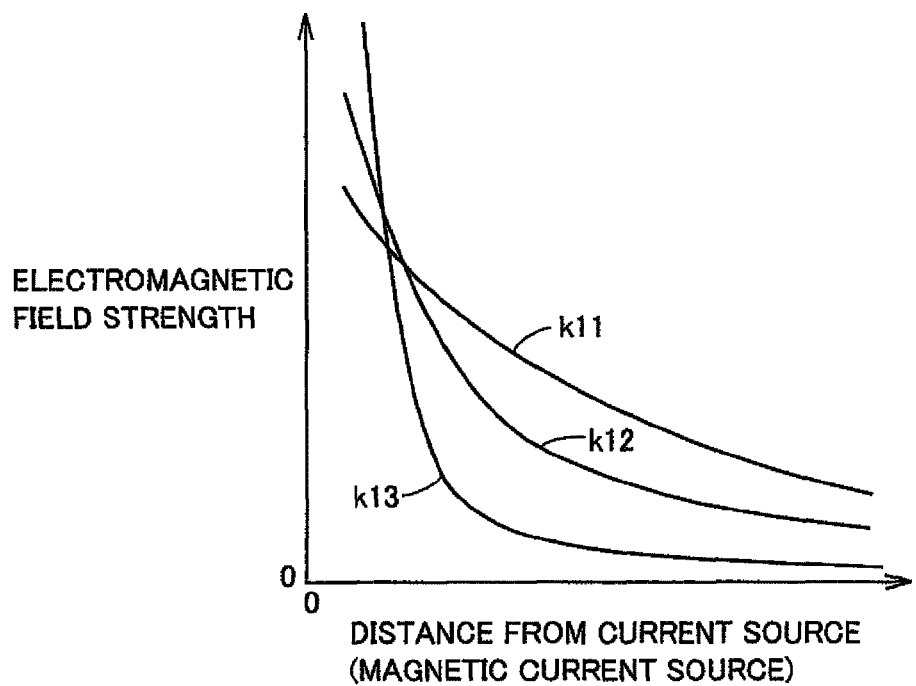
FIG. 5 shows relation between a distance from a current source (magnetic current source) and strength of an electromagnetic field.

FIG. 5 shows relation between a distance from a current source (magnetic current source) and strength of an electromagnetic field. Referring to FIG. 5, the electromagnetic field contains three components. A curve k11 denotes a component inversely proportional to a distance from a wave source, and is referred to as a "radiation electromagnetic field." A curve k12 denotes a component inversely proportional to the square of the distance from the wave source, and is referred to as an "induction electromagnetic field." A curve k13 denotes a component inversely proportional to the cube of the distance from the wave source, and is referred to as a "static electromagnetic field."

These electromagnetic fields include an area where electromagnetic wave strength decreases sharply with the distance from the wave source. Resonance uses this near field (evanescent field) to transmit energy (power). That is, by causing a pair of LC resonant coils having the same natural frequency to resonate with each other with the use of a near field, energy (power) is transmitted from one of the LC resonant coils (primary self-resonant coil) to the other LC resonant coil (secondary self-resonant coil). Since energy (power) is not propagated over a long distance in the near field, resonance can transfer power with less energy loss than an electromagnetic wave that transmits energy (power) in the "radiation electromagnetic field" in which energy is propagated over a long distance.

Figure 6:
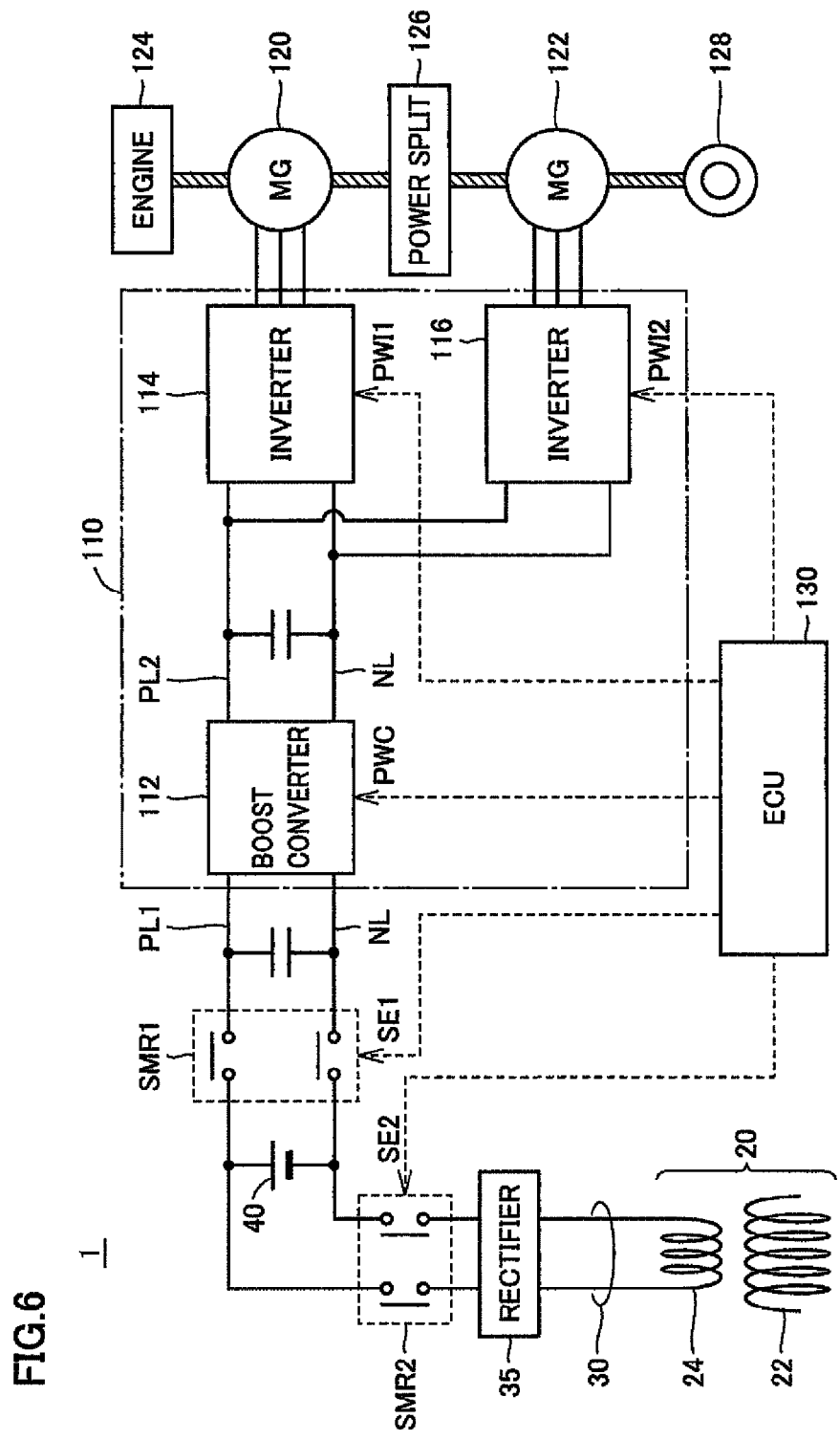
FIG. 6 is a block diagram showing a structure of a powertrain in the electrically powered vehicle shown in FIG. 1.

FIG. 6 is a block diagram showing a structure of a powertrain in electrically powered vehicle 1 shown in FIG. 1. FIG. 6 again shows an example where an LC resonant coil is used as a power receiving resonator. Referring to FIG. 6, electrically powered vehicle 1 includes power storage device 40, a system main relay SMR1, a PCU (Power Control Unit) 110, motor generators 120, 122, an engine 124, a power split device 126, and a drive wheel 128. Electrically powered vehicle 1 further includes power receiving resonator 20, power cable 30, rectifier 35, a system main relay SMR2, and an ECU (Electronic Control Unit) 130.

Electrically powered vehicle 1 incorporates engine 124 and motor generator 122 as a driving source. Engine 124 and motor generators 120, 122 are linked to power split device 126. Electrically powered vehicle 1 travels with a driving force generated by at least one of engine 124 and motor generator 122. Mechanical power generated by engine 124 is split into two paths by power split device 126. Namely, one is a path for transmitting the power to drive wheel 128, and the other is a path for transmitting the power to motor generator 120.

Motor generator 120 is an AC rotating electric machine, and includes a three-phase AC synchronous motor having a rotor in which a permanent magnet is buried, for example. Motor generator 120 generates power by using kinetic energy of engine 124 via power split device 126. When a state of charge (also referred to as an "SOC") of power storage device 40 becomes lower than a predetermined value, for example, engine 124 is actuated and motor generator 120 generates power, to charge power storage device 40.

As with motor generator 120, motor generator 122 is an AC rotating electric machine, and includes a three-phase AC synchronous motor having a rotor in which a permanent magnet is buried, for example. Motor generator 122 generates a driving force by using at least one of power stored in power storage device 40 and power generated by motor generator 120. The driving force from motor generator 122 is transmitted to drive wheel 128.

During braking of the vehicle or during acceleration reduction on a descending slope, mechanical energy stored in the vehicle as kinetic energy and potential energy is used via drive wheel 128 to drive motor generator 122 for rotation, so that motor generator 122 operates as a power generator. As a result, motor generator 122 operates as a regenerative brake for converting travel energy to power to generate a braking force. The power generated by motor generator 122 is stored in power storage device 40.

Power split device 126 includes a planetary gear having a sun gear, a pinion gear, a carrier, and a ring gear. The pinion gear engages with the sun gear and the ring gear. The carrier supports the pinion gear in a rotatable manner, and is linked to a crankshaft of engine 124. The sun gear is linked to a rotation shaft of motor generator 120. The ring gear is linked to a rotation shaft of motor generator 122 and drive wheel 128.

System main relay SMR1 is provided between power storage device 40 and PCU 110. System main relay SMR1 electrically connects power storage device 40 to PCU 110 when a signal SE1 from ECU 130 is activated, and cuts off an electrical path between power storage device 40 and PCU 110 when signal SE1 is deactivated.

PCU 110 includes a boost converter 112, and inverters 114, 116. Boost converter 112 boosts a voltage of a positive electrode line PL2 to be equal to or higher than an output voltage from power storage device 40 in response to a signal PWC from ECU 130. Boost converter 112 includes a DC chopper circuit, for example. Inverters 114, 116 are provided correspondingly to motor generators 120, 122, respectively. Inverter 114 drives motor generator 120 in response to a signal PWI1 from ECU 130, and inverter 116 drives motor generator 122 in response to a signal PWI2 from ECU 130. Inverters 114, 116 each include a three-phase bridge circuit, for example.

Power receiving resonator 20 includes a secondary self-resonant coil 22 and a secondary coil 24. Secondary coil 24 is provided coaxially with secondary self-resonant coil 22, and can be magnetically coupled to secondary self-resonant coil 22 by electromagnetic induction. Secondary coil 24 takes by electromagnetic induction power received by secondary self-resonant coil 22, and outputs the same to rectifier 35 via power cable 30.

Rectifier 35 rectifies the AC power taken by secondary coil 24. System main relay SMR2 is provided between rectifier 35 and power storage device 40. System main relay SMR2 electrically connects power storage device 40 to rectifier 35 when a signal SE2 from ECU 130 is activated, and cuts off an electrical path between power storage device 40 and rectifier 35 when signal SE2 is deactivated.

ECU 130 generates signals PWC, PWI1, PWI2 for driving boost converter 112 and motor generators 120, 122, respectively, based on an accelerator position, a vehicle speed, and other signals from various sensors, and outputs generated signals PWC, PWI1, PWI2 to boost converter 112 and inverters 114, 116, respectively. During travel of the vehicle, ECU 130 activates signal SE1 to turn system main relay SMR1 on, and deactivates signal SE2 to turn system main relay SMR2 off.

During power feeding from the power feeding apparatus (FIG. 1) to electrically powered vehicle 1, ECU 130 activates signal SE2 to turn system main relay SMR2 on. A DC/DC converter may be provided between rectifier 35 and power storage device 40. Then, the power rectified by rectifier 35 may be converted by the DC/DC converter to have a voltage level of power storage device 40, and output to power storage device 40.

It is also possible for electrically powered vehicle 1 to receive power from the power feeding apparatus during travel by turning both system main relays SMR1, SMR2 on.

As described above, in the first embodiment, power receiving resonator 20 receives high-frequency power from power transferring resonator 60 of the power feeding apparatus by resonating with power transferring resonator 60 through an electromagnetic field. Since power receiving resonator 20 is provided under underbody 10 made of iron, an electromagnetic wave generated around power receiving resonator 20 due to the reception of high-frequency power is shielded by underbody 10, so that effect of the electromagnetic wave on the inside of the vehicle is suppressed. Further, while the electromagnetic wave generated due to the power reception is propagated through power cable 30 for transferring the power received by power receiving resonator 20 to power storage device 40, power cable 30 is also provided under underbody 10 made of iron in this electrically powered vehicle, so that an electromagnetic wave generated by power cable 30 is also shielded by underbody 10. According to the first embodiment, therefore, adverse effect on electric equipment in the vehicle caused by the electromagnetic wave generated due to the power reception from the power feeding apparatus can be suppressed.

Moreover, in the first embodiment, while power storage device 40 is provided over underbody 10 (i.e., inside of the vehicle), power storage device 40 is covered with member 42 capable of shielding an electromagnetic wave, so that effect of the electromagnetic wave on the inside of the vehicle can be suppressed more sufficiently. Furthermore, in the first embodiment, rectifier 35 is also provided under underbody 10 (i.e., outside of the vehicle), so that effect of the electromagnetic wave on the inside of the vehicle can be reliably suppressed.

First Modification

FIG. 7 shows arrangement of main parts in the present invention seen from a side of an electrically powered vehicle according to a first modification of the first embodiment. Referring to FIG. 7, in an electrically powered vehicle 1A, power storage device 40 is provided under a rear seat 44 in the structure of electrically powered vehicle 1 shown in FIG. 1. The remaining structure of electrically powered vehicle 1A is the same as that of electrically powered vehicle 1 described above. Although not particularly shown, power storage device 40 may be provided under a front seat.

According to the first modification, the effect similar to that of the first embodiment can be obtained again.

Second Modification

FIG. 8 shows arrangement of main parts in the present invention seen from a side of an electrically powered vehicle according to a second modification of the first embodiment. Referring to FIG. 8, in an electrically powered vehicle 1B, power storage device 40 is provided under a center console 46. The remaining main structure of electrically powered vehicle 1B is the same as that of electrically powered vehicle 1 according to the first embodiment.

According to the second modification, the effect similar to that of the first embodiment can be obtained again.

Second Embodiment

Figure 9:
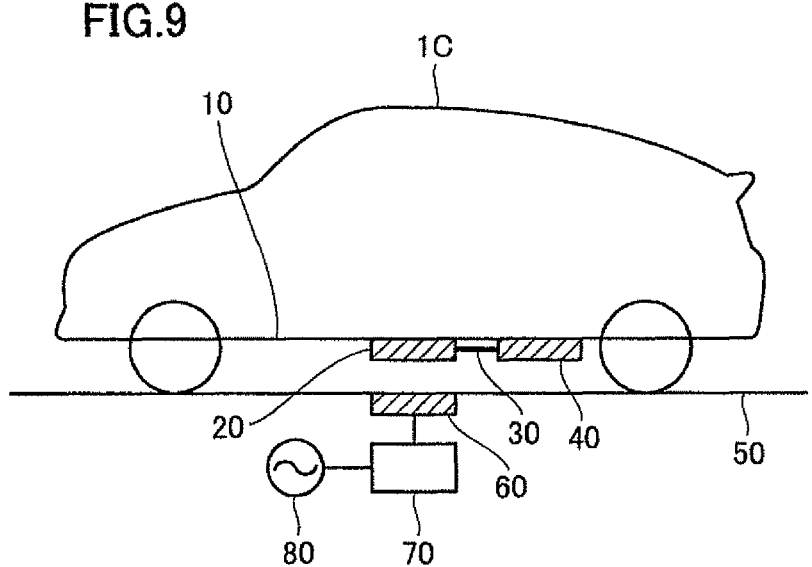
FIG. 9 shows arrangement of main parts in the present invention seen from a side of an electrically powered vehicle according to a second embodiment.

FIG. 9 shows arrangement of main parts in the present invention seen from a side of an electrically powered vehicle according to a second embodiment. Referring to FIG. 9, in an electrically powered vehicle 1C, power storage device 40 is also provided under underbody 10 (i.e., outside of the vehicle) together with power receiving resonator 20 and power cable 30 in the structure of electrically powered vehicle 1 according to the first embodiment shown in FIG. 1. The remaining main structure of electrically powered vehicle 1C is the same as that of electrically powered vehicle 1.

Figure 10:
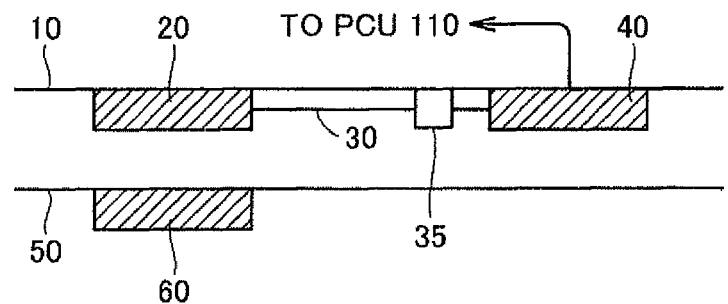
FIG. 10 is an enlarged view of a portion around an underbody of the electrically powered vehicle shown in FIG. 9.

FIG. 10 is an enlarged view of a portion around the underbody of electrically powered vehicle 1C shown in FIG. 9. Referring to FIG. 10, in electrically powered vehicle 1C, power storage device 40 is also provided under underbody 10 made of iron (i.e., outside of the vehicle). Power storage device 40 is provided under underbody 10 (i.e., outside of the vehicle) because the high-frequency electromagnetic wave generated due to the power reception may be propagated through power storage device 40 which is electrically connected to power cable 30 and power receiving resonator 20, although via rectifier 35. For this reason, instead of covering power storage device 40 provided over underbody 10 (i.e., inside of the vehicle) with member 42 capable of shielding an electromagnetic wave, power storage device 40 is provided under underbody 10 (i.e., outside of the vehicle) made of iron which is highly effective in electromagnetic shielding, thereby reliably suppressing entry of the electromagnetic wave into the vehicle.

As described above, in the second embodiment, power storage device 40 is provided under underbody 10 made of iron (i.e., outside of the vehicle), so that an electromagnetic wave generated by power storage device 40 is also shielded by underbody 10. Therefore, according to the second embodiment, adverse effect on electric equipment in the vehicle caused by the electromagnetic wave generated due to the power reception from the power feeding apparatus can be suppressed again.

While a series/parallel hybrid vehicle capable of splitting mechanical power of engine 124 by power split device 126 to transmit the resultant power to drive wheel 128 and motor generator 120 was described as an electrically powered vehicle in each of the embodiments described above, the present application is also applicable to hybrid vehicles of other types. That is, the present invention is also applicable, for example, to a so-called series hybrid vehicle which uses engine 124 only for driving motor generator 120 and generates a driving force of the vehicle only by motor generator 122, a hybrid vehicle in which only regenerative energy out of kinetic energy generated by engine 124 is recovered as electric energy, and a motor-assisted hybrid vehicle in which an engine is used as a main driving source and a motor assists the engine as necessary.

The present invention is also applicable to an electric vehicle not including engine 124 but traveling only with power, or a fuel cell vehicle including a fuel cell in addition to power storage device 40 as a DC power supply. The present invention is also applicable to an electrically powered vehicle not including boost converter 112.

It should be understood that the embodiments disclosed herein are illustrative and non-restrictive in every respect. The scope of the present invention is defined by the terms of the claims, rather than the description over, and is intended to include any modifications within the scope and meaning equivalent to the terms of the claims.

The invention claimed is:

1. An electrically powered vehicle capable of traveling with power supplied from a power supply outside of the vehicle, the electrically powered vehicle comprising:
   a power receiving resonator provided on an outside of the vehicle, the power receiving resonator being configured to receive power from a power transferring resonator of said power supply by resonating with said power transferring resonator through an electromagnetic field;
   a power storage device provided inside of the vehicle for storing the power received by said power receiving resonator;
   a power cable disposed on the outside of the vehicle, the power cable being configured to transfer the power received by said power receiving resonator to said power storage device; and
   a shield member covering said power storage device, the shield member being capable of shielding an area inside of the vehicle that excludes an area covered by the shield member from an electromagnetic wave that propagates through the power cable, wherein
      when viewed from a side of the vehicle, said power cable comes into the vehicle at a position directly underneath said power storage device to be connected to said power storage device.

2. The electrically powered vehicle according to claim 1, further comprising:
   a rectifier provided outside of the vehicle, the rectifier being: i) connected to the power receiving resonator, ii) connected to the power storage device, and iii) configured to rectify AC power received by said power receiving resonator.

3. The electrically powered vehicle according to claim 1, wherein when viewed from the side of the vehicle, said power cable comes into the vehicle directly underneath said shield member.

4. The electrically powered vehicle according to claim 1, wherein said power storage device is provided below a seat or a center console.

5. The electrically powered vehicle according to claim 3, wherein said power storage device is provided below a seat or a center console.

6. An electrically powered vehicle capable of traveling with power supplied from a power supply outside of the vehicle, the electrically powered vehicle comprising:
   a power receiving resonator provided on an outside of the vehicle, the power receiving resonator being configured to receive power from a power transferring resonator of said power supply by resonating with said power transferring resonator through an electromagnetic field;
   a power storage device provided inside of the vehicle for storing the power received by said power receiving resonator;
   a power cable disposed on the outside of the vehicle, the power cable being configured to transfer the power received by said power receiving resonator to said power storage device; and
   a shield member covering said power storage device, the shield member being capable of shielding an area inside of the vehicle that excludes an area covered by the shield member from an electromagnetic wave that propagates through the power cable, wherein when viewed from a side of the vehicle, said power cable is directed to a position underneath said power storage device and comes into the vehicle to be connected to said power storage device.

7. The electrically powered vehicle according to claim 6, further comprising:
a rectifier provided outside of the vehicle, the rectifier being: i) connected to the power receiving resonator, ii) connected to the power storage device, and iii) configured to rectify AC power received by said power receiving resonator.

8. The electrically powered vehicle according to claim 6, wherein when viewed from a side of the vehicle, said power cable comes into the vehicle directly underneath said shield member.

9. The electrically powered vehicle according to claim 6, wherein said power storage device is provided below a seat or a center console.

10. The electrically powered vehicle according to claim 8, wherein said power storage device is provided below a seat or a center console.

* * * * *